3,651,156
PROCESS FOR THE MANUFACTURE OF FLUORINATED ALIPHATIC HYDROCARBON COMPOUNDS
Otto Scherer, Bad Soden, Taunus, and Jurgen Korinth, Hofheim, Taunus, Germany, assignors to Farbwerke Hoechst Aktiengesellschaft vormals Meister Lucius & Bruning, Frankfurt am Main, Germany
No Drawing. Continuation-in-part of application Ser. No. 681,077, Nov. 7, 1967. This application June 20, 1969, Ser. No. 835,238
Claims priority, application Germany, Nov. 12, 1966, F 50,664
Int. Cl. C07c *19/08*
U.S. Cl. 260—653    8 Claims

ABSTRACT OF THE DISCLOSURE

Manufacture of fluorinated aliphatic hydrocarbon compounds by disproportionation of fluorinated aliphatic substances under the influence of a catalyst obtained by fluorination at elevated temperatures of a hydrated oxide of trivalent chromium with hydrogen fluoride.

---

This is a continuation-in-part application of our co-pending application Ser. No. 681,077 filed Nov. 7, 1967.

The present invention relates to a process for the manufacture of fluorinated aliphatic hydrocarbon compounds by disproportionation of fluorinated aliphatic substances.

Since the fluorination of halogenated aliphatic compounds with hydrofluoric acid generally yields a plurality of fluorine-containing products only some of which are of technical interest, it is desirable to convert the remaining less useful compounds to more valuable products without using further chemicals.

It has already been proposed to disproportionate fluorinated aliphatic hydrocarbons in a manner such that compounds having a higher or lower fluorine content than the starting compounds are formed. The reaction is carried out in the presence of a catalyst. As catalysts, $AlCl_3$, $AlF_3$ and $Cr_2O_3$ have been used. It has been proposed, for example, to react monofluorotrichloromethane and difluorodichloromethane using $AlCl_3$ and $AlF_3$. According to another proposal, tetrafluorodichloroacetone is converted to hexafluoroacetone in the presence of a $Cr_2O_3$ catalyst.

The present invention provides a process for the manufacture of fluorinated aliphatic hydrocarbon compounds by disproportionation at elevated temperatures in the presence of a catalyst, which comprises passing a saturated halogen derivative of an aliphatic hydrocarbon compound having from 1 to 4 carbon atoms which compound contains in addition to at least one fluorine atom bound to a carbon atom, a chlorine or bromine atom bound to the same carbon atom, at a temperature within the range of 20 to 500° C. over a catalyst depicted by the formula $CrO_{1-2} \cdot F_{2-1}$ which has been obtained by fluorinating a hydrated oxide of trivalent chromium with hydrogen fluoride preferably together with an inert gas such as nitrogen, at a temperature within the range of 150 to 600° C.

Generally, in the preparation of the catalyst being described in British Pat. 1,025,759, the molecular proportions of the inert gas to the hydrofluoric acid is up to 100:1, preferably 10:1. In order to obtain a catalyst of sufficient activity, it is recommended that the fluorination of the chromic compound is carried out at a temperature between 150 to 600° C., preferably between 350 to 450° C. Hydrated oxides of trivalent chromium having the formula $Cr_2O_3 \cdot xH_2O$, where $x$ may be 1 to 9, are described in Gmelins Handbuch der Anorganischen Chemie 1962, vol. Chrom B, Page 60, as being hydration derivates of chromic oxide, e.g. chromic hydroxide $(2Cr(OH)_3 = Cr_2O_3 \cdot 3H_2O)$ and Guignet's green; according to Kirk-Othmer, vol. 3, p. 945, the latter is a hydrated chromic oxide. Gmelins Handbuch, loc. cit., p. 81, shows the Formula $Cr_2O_3 \cdot 2H_2O$ for Guignet's green (cf. also Fricke-Hüttig "Hydroxide und Oxydhydrate", Leipzig 1937, pp. 252–268).

The catalyst to be used in the process of the invention has the empirical composition $Cr:F:O = 1:(2 \text{ to } 1):(1 \text{ to } 2)$ and may be considered to be chromium oxyfluoride.

In the process of the invention it is also possible to use mixtures of the aforesaid fluorinated aliphatic compounds. Furthermore, mixtures of saturated halogen derivatives of aliphatic hydrocarbon compounds having 1 to 4 carbon atoms containing in addition to at least one fluorine atom bound to a carbon atom a fluorine, chlorine or bromine atom bound to the same carbon atom, with saturated halogen derivatives of aliphatic hydrocarbon compounds having 1 to 4 carbon atoms which are free from fluorine but in which to at least one carbon atom at least two halogen atoms selected from chlorine and bromine are bound may be used. Preferred starting products for the disproportionation are halogen derivatives of methane, ethane, propane and/or butane, i.e. hydrocarbons of the general formula $C_nH_{2n+2}$, where $n$ is a whole number within the range of 1 to 4. Particularly advantageous are those compounds of the formula in which 1 to $n+1$ hydrogen atoms have been replaced by fluorine and which, for the rest, contain only chlorine and 0 to 2 hydrogen atoms.

Moreover, it is possible to start from mixtures of different halogenated hydrocarbon compounds which contain compounds of different degrees of fluorination.

In many cases unfluorinated compounds are formed as by-products, i.e. compounds which have exchanged their fluorine for another halogen. From $CCl_3F$, for example, $CCl_4$ is obtained in addition to $CCl_2F_2$ and $CClF_3$.

The process in accordance with the invention offers a special advantage in that mixtures of halogenated but unfluorinated compounds with fluorinated compounds may be passed over the catalyst to be used.

For this purpose fluorinated compounds are preferred which are formed from unfluorinated compounds by exchanging one or more halogen atoms for fluorine. Mixtures of highly fluorinated compounds with their corresponding unfluorinated chlorine compounds, for example, $CClF_3$ and $CCl_4$, $CHF_3$ and $CHCl_3$ or $C_2F_5Cl$ and $C_2Cl_6$ are preferably used. By reacting such mixtures in the presence of the catalyst there are obtained, in addition to the starting components, the medium-fluorinated compounds corresponding to the chemical equilibrium which, because of their higher boiling points, are generally more interesting than the highly fluorinated compounds.

Disproportionation is carried out at temperatures within the range of 20 to 500° C., preferably 80 to 400° C. For $C_1$-compounds, the temperatures are advantageously within the range of 80 to 200° C. To obtain $CCl_2F_2$ from $CCl_3F$, temperatures within the range of 80 to 150° C. are preferably used.

Since in all these reactions the volume remains unchanged, the process may be carried out under atmospheric, elevated or reduced pressure.

As material for the container to be used for the disproportionation there may be used any material that is sufficiently corrosion-resistant under the reaction conditions, particularly materials that are resistant to hydrogen fluoride at the temperatures applied, for example, steel and steel alloys such as stainless steels, nickel and nickel alloys such as Monel metal, hestalloy, aluminum and aluminum alloys, and the noble metals such as gold, silver and platinum.

Compared with the known art, the process in accordance with the invention has the advantage of being very selective. Whereas, for example, by the treatment of $CCl_3F$ (R 11) in the presence of $AlCl_3$ and $AlF_3$ about 4% $CClF_3$ (R 13) is obtained at 100° C. in addition to the desired $CCl_2F_2$ (R 12), while at 170° C. 78% of the $CCl_3F$ (R 11) already passes into the undesired $CClF_3$, only 2% $CClF_3$ (R 13) is formed in the process of the invention from $CCl_3F$ (R 11) in addition to 85% of the desired $CCl_2F_2$ (R 12) at a temperature as high as 200° C. At 120° C., for example, no undesirable $CClF_3$ (R 13) is formed with a conversion of 89% of the starting material $CCl_3F$ (R 11) to $CCl_2F_2$ (R 12) $+CCl_4$.

The following examples serve to illustrate the invention, but are not intended to limit it.

EXAMPLE 1

400 grams $CFCl_3$ per liter of catalyst and per hour were passed in the gaseous state at a temperature of 120° C. over a catalyst obtained by fluorination of cubic chrome oxide green (Guignet's green). 89% of the $CFCl_3$ was disproportionated to $CCl_4+CF_2Cl_2$. No substantial losses of product arose.

EXAMPLE 2

200 grams $CF_2Cl_2$ were passed per hour at 300° C. over 1 liter of a catalyst which had been obtained by fluorination of chromium hydroxide and had been placed in a tube of an internal diameter of 50 mm. The gases leaving the reaction furnace contained 0.6 mol percent $CF_4$, 55.0 mol percent $CF_3Cl$, 11.8 mol percent $CF_2Cl_2$, 9.4 mol percent $CFCl_3$ and 23.2 mol percent $CCl_4$. No substantial losses of product arose.

EXAMPLE 3

100 grams $CHF_2Cl$ per liter of catalyst and per hour were passed at 100° C. over a catalyst obtained by fluorination of chrome oxide green (Guignet's green). The gases leaving the catalyst contained 65.1 mol percent $CHF_3$, 2.0 mol percent $CHF_2Cl$, 1.6 mol percent $CHFCl_2$ and 31.3 mol percent $CHCl_3$. No losses of product arose.

EXAMPLE 4

200 grams $C_2F_3Cl_3$ per liter of catalyst and per hour were passed at 200° C. over a catalyst obtained by fluorination of chromium hydroxide. The gases leaving the reaction zone contained 0.5 mol percent $C_2F_5Cl$, 38.1 mol percent $C_2F_4Cl_2$, 27.0 mol percent $C_2F_3Cl_3$, 33.4 mol percent $C_2F_2Cl_4$ and 1.1 mol percent $C_2FCl_5+C_2Cl_4$.

EXAMPLE 5

100 grams $CF_3Cl$ and 150 grams $CCl_4$ per liter of catalyst and per hour were passed at 300° C. over the catalyst described in Example 4. The gases leaving the reaction furnace contained 0.5 mol percent $CF_4$, 49.5 mol percent $CF_3Cl$, 22.2 mol percent $CF_2Cl_2$, 10.7 mol percent $CFCl_3$ and 35.0 mol percent $CCl_4$. No losses of product arose.

We claim:
1. A process for the manufacture of fluorinated aliphatic hydrocarbon compounds by disproportionation at elevated temperatures in the presence of a catalyst, which comprises passing a saturated halogen derivative of an aliphatic hydrocarbon compound having from 1 to 4 carbon atoms containing in addition to at least one fluorine atom bound to a carbon atom a chlorine or bromine atom bound to the same carbon atom, at a temperature within the range of from 20 to 500° C. over a catalyst, which has been obtained by fluorinating a hydrated oxide of trivalent chromium with hydrogen fluoride at a temperature within the range of from 150 to 600° C.

2. A process as claimed in claim 1, wherein a mixture of the defined fluorinated aliphatic compounds is passed over said catalyst.

3. A process as claimed in claim 1, wherein mixtures of saturated halogen derivatives of aliphatic hydrocarbon compounds with 1 to 4 carbon atoms, which compounds contain in addition to at least one fluorine atom bound to a carbon atom, a fluorine, chlorine or bromine atom bound to the same carbon atom, with saturated halogen derivatives of aliphatic hydrocarbon compounds having 1 to 4 carbon atoms which are free from fluorine but in which at least two halogen atoms of the group consisting of chlorine and bromine are bound to at least one carbon atom, are passed over a catalyst as described in claim 1.

4. A process as claimed in claim 1, wherein, at a temperature within the range of from 80 to 150° C., $CFCl_3$ is passed over a catalyst obtained by fluorination at a temperature within the range of from 150 to 600° C. of Guignet's Green with hydrogen fluoride, and wherein a mixture consisting essentially of $CCl_4$ and $CF_2Cl_2$ is recovered as disproportionation product.

5. A process as claimed in claim 1, wherein $CF_2Cl_2$ is passed at a temperature within the range of from 80 to 400° C. in an non-corrosive metal pipe reactor zone over a catalyst obtained by fluorinating chromic hydroxide with hydrogen fluoride at a temperature within the range of from 150 to 600° C., and wherein a mixture consisting essentially of $CF_3Cl$, $CF_2Cl_2$, $CFCl_3$ and $CCl_4$ is recovered as disproportionation product.

6. A process as claimed in claim 1, wherein $CHF_2Cl$ is passed in a non-corrosive metal pipe reactor zone over a catalyst obtained by fluorination at a temperature from 150 to 600° C. of Guignet's Green with hydrogen fluoride at a temperature within the range of from 80 to 200° C., and wherein a mixture consisting essentially of $CHF_3$ and $CHCl_3$ is recovered as disproportionation product.

7. A process as claimed in claim 1, wherein $C_2F_3Cl_3$ is passed in a non-corrosive metal pipe reactor zone over a catalyst obtained by fluorination at a temperature from 150° to 600° C. of chromic hydroxide with hydrogen fluoride at a temperature within the range of from 80 to 400° C., and wherein a mixture consisting essentially of $C_2F_4Cl_2$, $C_2F_3Cl_3$ and $C_2F_2Cl_4$ is recovered as disproportionation product.

8. A process as claimed in claim 3 wherein a mixture of $CF_3Cl$ and $CCl_4$ is passed in a non-corrosive metal pipe reactor zone over a catalyst obtained by fluorination at a temperature from 150 to 600° C. of chromic hydroxide with hydrogen fluoride at a temperature within the range of 80 to 400° C., and wherein a mixture consisting essentially of $CF_3Cl$, $CF_2Cl_2$, $CFCl_3$ and $CCl_4$ is recovered as disproportionation product.

References Cited

FOREIGN PATENTS 1,544,361  10/1968  France _____ 260—653

DANIEL D. HORWITZ, Primary Examiner

U.S. Cl. X.R.

252—441